P. M. SCHNECKENBURGER.
SPRING WHEEL.
APPLICATION FILED AUG. 23, 1920.
1,415,716.
Patented May 9, 1922.
2 SHEETS—SHEET 1.
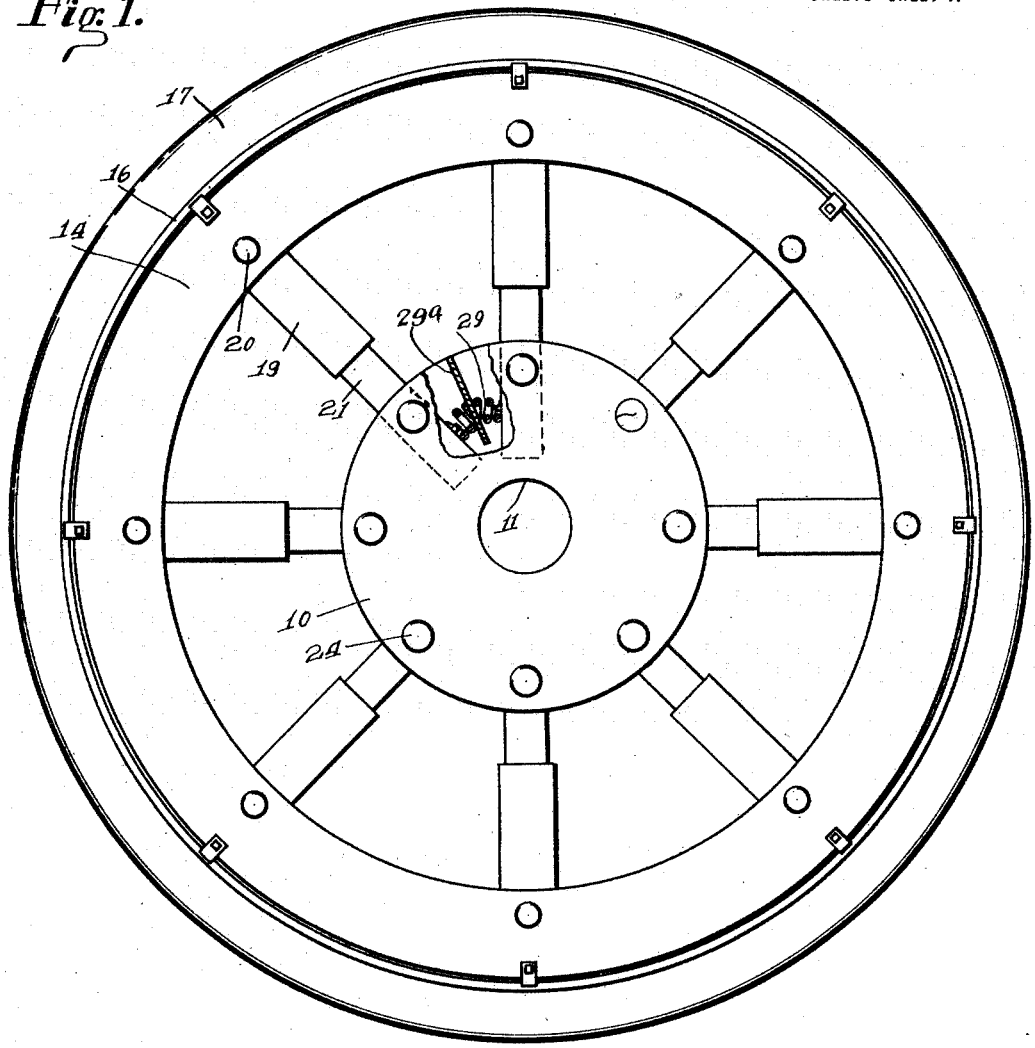
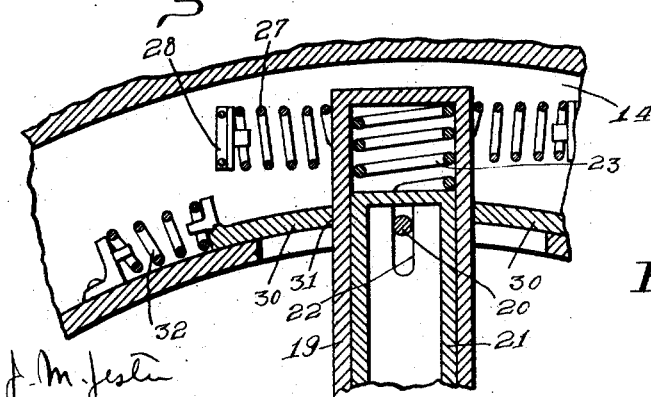
P. M. Schneckenburger, INVENTOR
BY Victor J. Evans
ATTORNEY P. M. SCHNECKENBURGER.
SPRING WHEEL.
APPLICATION FILED AUG. 23, 1920.
1,415,716.
Patented May 9, 1922.
2 SHEETS—SHEET 2.
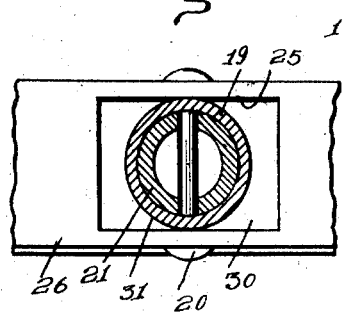
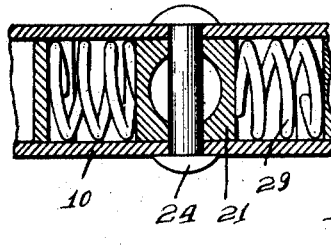
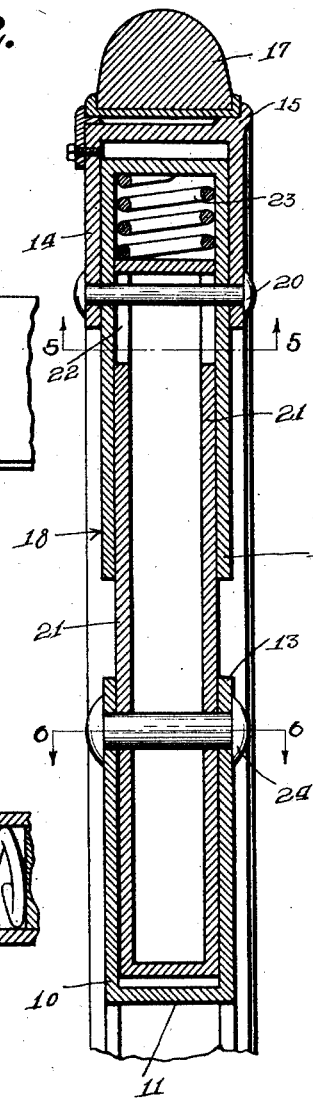
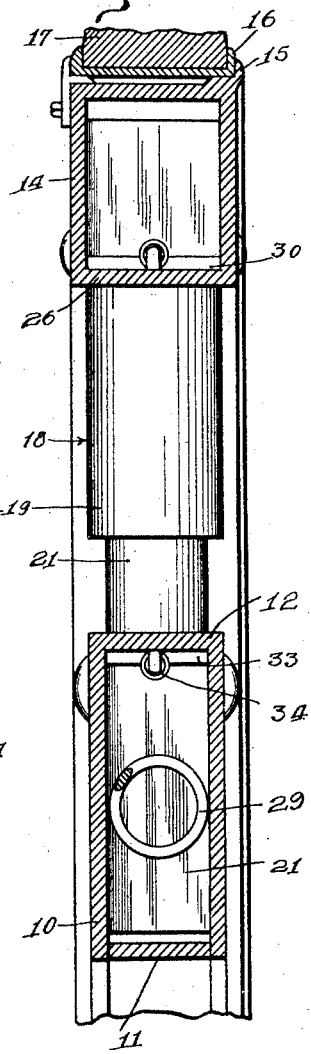
P. M. Schneckenburger,
INVENTOR
BY Victor J. Evans
ATTORNEY
WITNESS:

UNITED STATES PATENT OFFICE.

PAUL M. SCHNECKENBURGER, OF WOLCOTT, INDIANA.

SPRING WHEEL.

1,415,716.  Specification of Letters Patent.  Patented May 9, 1922.

Application filed August 23, 1920. Serial No. 405,267.

*To all whom it may concern:*

Be it known that I, PAUL M. SCHNECKENBURGER, a citizen of the United States, residing at Wolcott, in the county of White and State of Indiana, have invented new and useful Improvements in Spring Wheels, of which the following is a specification.

This invention relates to resilient wheels and has for its object the provision of a spring wheel comprising a series of telescopic spokes provided internally with springs whereby to afford resilience, each spoke member being pivotally mounted and being engaged by springs which abut against opposite sides whereby to hold the spokes normally in radial position.

An important object is the provision of a spring wheel of this character in which the outer rim member within which the spoke members are fastened has its inner periphery closed and the hub has its outer periphery closed except for elongated openings through which the spokes pass, these openings being covered by slidable arcuate plates through which the spokes pass and to which are connected springs.

An additional object is the provision of a spring wheel of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of a wheel constructed in accordance with my invention, Figure 2 is a cross sectional view through a portion thereof showing it on a larger scale, Figure 3 is a longitudinal sectional view of the wheel taken in a plane parallel with the sides of the wheel, Figure 4 is a cross sectional view taken between spokes, Figure 5 is a cross sectional view through one of the spokes looking toward the outer rim, and Figure 6 is a similar view looking toward the hub.

Referring more particularly to the drawings, I have shown the hub portion of my wheel as comprising a pair of side plates 10 having central holes and connected by a central cylindrical sleeve 11 within which any suitable ball bearing structure may be secured if desired, or which may be provided with any suitable hub structure whereby to be secured upon a drive axle. The outer periphery of the hub portion formed by the plates 10 is closed by a ring 12 formed at spaced intervals with openings 13.

The numeral 14 designates the felly of the wheel which is channel shaped and which is provided with the usual lug structure 15 for holding in position a demountable rim 16 carrying a solid rubber tire 17.

Disposed between the hub and felly portions are spokes designated broadly by the numeral 18 and each spoke includes an outer portion 19 which is tubular located within the channeled felly 14 and the outer end is closed. Each spoke member is held associated with the felly by means of a transverse bolt 20 which passes through the spoke member and through both sides of the felly. Slidable within each spoke member 19 is an inner tubular spoke member 21 which has its outer end closed and which is provided in opposite sides with longitudinal slots 22 engaged upon the bolt 20 whereby to permit telescopic movement of the members or sections 19 and 21. Engaged between the closed outer ends of the members or sections 19 and 21 are coil springs 23 which afford proper resilience to the wheel. The inner spoke members 21 extend between the hub plates 10 and are pivoted therebetween by bolts 24. The inner spoke members pass through the openings 13 in the ring 12 and the spoke members 19 pass through similar openings 25 in the ring 26 which closes the inner periphery of the felly.

In order to hold the spokes in radially extending position, I provide springs 27 which engage against the opposite sides of the outer ends of the spoke sections 19 and which also engage against abutment shoulders 28 within the felly. Similar springs 29 are employed between the hub plates 10 and engage against the inner ends of the spoke sections 21 and against partition plates 29ª between the spokes.

In order to close the openings 13 and 25 in the rings 12 and 26, respectively, I provide shutter plates corresponding in number to the number of spokes and each shutter plate 30 is formed with a central hole 31 snugly accommodating a spoke section 19. The ends of the plates 30 are engaged by coil springs 32 which operate to hold the plates in normal position and which of course tend to prevent movement of the spokes into any position other than radial. Mounted upon the ring 12 are similar shutter plates 33 engaged by springs 34 and which are for the purpose of excluding dirt from the hub and felly while not preventing the necessary movement of the spokes during the travel of the wheel.

From the foregoing description and a study of the drawings, it will be apparent that I have thus provided a simply constructed and consequently inexpensive wheel which entirely obviates the employment of the usual pneumatic tire without sacrificing resilience. Another feature is that punctures and blow-outs are of course impossible so that the cost in tire wear will be greatly reduced.

While I have shown and described the preferred embodiment of my invention, it is of course to be understood that I reserve the right to make such changes in the form, construction, and arrangement of parts as will not depart from the spirit of the invention of the scope of the subjoined claims.

Having thus described my invention, I claim:

1. A spring wheel comprising a hub portion, a felly carrying a rim, telescopic spoke members enclosing springs and pivotally connected with the felly and with the hub member, said pivot point being spaced from the ends of the spokes, springs engaging the outer ends of the spokes whereby to oppose circumferential movement, partition plates in the hub member between the successive spokes, and coil springs engaging the inner ends of the spokes and said partition plates for assisting in opposing circumferential movement of the spokes.

2. A spring wheel comprising a hub portion, a felly carrying a rim, telescopic spoke members pivotally connected with the felly and with the hub member, the felly being hollow and being provided at its inner periphery with an elongated slot at each spoke, an arcuate plate associated with each spoke and extending over and normally closing the associated slot, bracket members secured on the outer periphery of the inner portion of the felly, similar bracket members on the ends of said plates, and springs interposed between the associated pairs of brackets for opposing circumferential movement of the plates and spokes.

3. A spring wheel comprising a hub, a felly carrying a rim telescopic spoke members pivotally connected with the felly and the hub, the felly being hollow and having its inner periphery formed with an elongated slot for the passage of each spoke, an arcuate plate associated with each spoke extending over and normally closing the associated slot, bracket members secured upon the outer surface of the inner peripheral wall of the felly, similar bracket members on the ends of said plates, springs interposed between the associated pairs of brackets, brackets secured upon the inner surface of one side wall of the felly at opposite sides of each spoke, and springs disposed between said last named brackets and the outer end portions of the spokes.

In testimony whereof I affix my signature.

PAUL M. SCHNECKENBURGER.